United States Patent [19]
Morita

[11] 3,910,237
[45] Oct. 7, 1975

[54] STRUCTURE OF A ROTOR OF A ROTARY PISTON ENGINE

[75] Inventor: Minoru Morita, Nagoya, Japan

[73] Assignee: Toyota Jidosha Kogyo Kabushiki Kaisha, Aichi, Japan

[22] Filed: Apr. 30, 1974

[21] Appl. No.: 465,486

[30] Foreign Application Priority Data
Jan. 11, 1974  Japan.................... 49-6482

[52] U.S. Cl. ............................. 123/8.45
[51] Int. Cl.² ........................... F02B 55/14
[58] Field of Search ....... 123/8.09, 8.11, 8.13, 8.05, 123/8.45; 418/61 A

[56] References Cited
UNITED STATES PATENTS

| | | |
|---|---|---|
| 3,584,607 | 6/1971 | Yamamoto ..................... 123/8.45 |
| 3,699,929 | 10/1972 | Bennethum ..................... 123/8.09 |
| 3,780,707 | 12/1973 | Cole ........................... 123/8.13 |

FOREIGN PATENTS OR APPLICATIONS

| | | |
|---|---|---|
| 1,426,036 | 9/1969 | Germany .......................... 123/8.45 |
| 1,013,093 | 12/1965 | United Kingdom................ 123/8.45 |

Primary Examiner—C. J. Husar
Assistant Examiner—Leonard E. Smith
Attorney, Agent, or Firm—Stewart and Kolasch, Ltd.

[57] ABSTRACT

A structure of a rotor of a rotary piston engine of the type wherein the opening of the exhaust port at the center housing is controlled by being traversed by the apexes of a polygonal rotor eccentrically rotating in an engine casing. A peripheral portion of the rotor extending between each of the adjacent apexes thereof is provided with a leading recess positioned in front of the rotor contact point at the opening phase of the exhaust port, as seen in the rotational direction of the rotor and a trailing recess positioned behind the rotor semi-contact point at the closing phase of the exhaust port, as seen in the rotational direction of the rotor.

9 Claims, 9 Drawing Figures

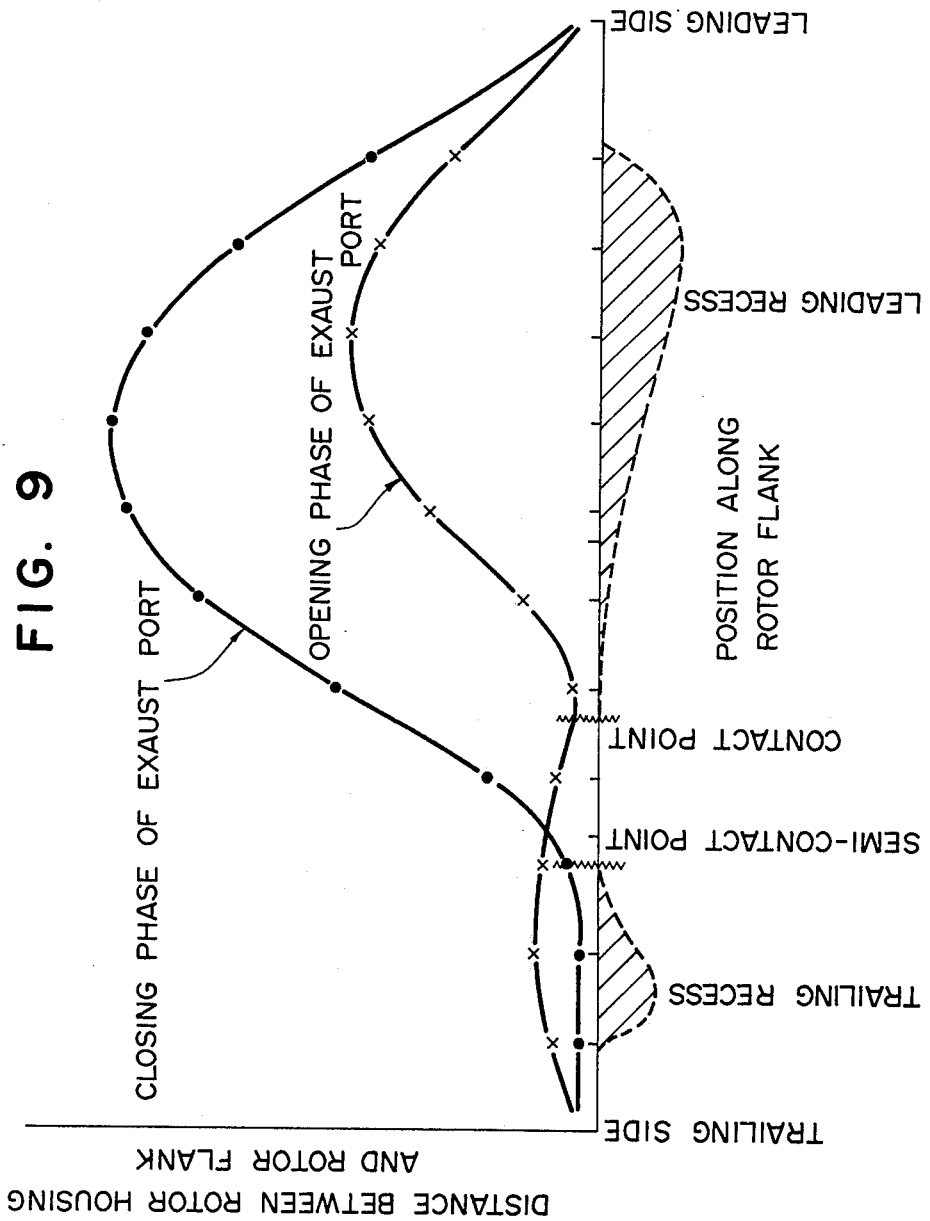

STRUCTURE OF A ROTOR OF A ROTARY PISTON ENGINE

BACKGROUND OF THE INVENTION

1. Field of the Invention

The present invention relates generally to a rotary piston engine, and more particularly, to the structure of a rotor of a rotary piston engine of the type comprising at least two side housings and a center housing disposed therebetween. The housings define a casing in which a polygonal rotor rotates eccentrically with its apexes contacting the inside surface of said center housing in a manner to perform suction, compression, combustion, expansion and exhaust strokes due to the change in the volume of the chambers defined by said casing and said rotor. An exhaust port is provided at a wall of said center housing with the opening thereof being controlled by the traversal of the apexes of said rotor.

2. Description of the Prior Art

In a rotary piston engine of the aforementioned type, if the engine is designed to have a sufficiently long port opening duration for suction and exhausting purposes, there occurs an overlapping of the suction and exhaust strokes, whereby the internal exhaust gas recirculation or remaining ratio increases thereby lowering the intake efficiency. Thus the intake performance becomes unstable and the limit of the lean fuel air mixture combustion is lowered. To counteract these problems, a rotor equipped with seal means for preventing the overlapping or with a cam for preventing the overlapping has been proposed.

In another aspect of the rotory piston engine of the aforementioned type, it has been proposed to modify a trailing recess which is provided at the peripheral portion of the rotor extending between each of the adjacent apexes thereof and position it close to the trailing end of the peripheral portion as seen in the rotational direction of the rotor, as a relatively deep trailing recess, for the purpose of moderating the maximum combustion pressure and thereby to suppressing the generation of harmful NO gas, extending the combustion time to lower the emission of combustible gases such as CO, HC, etc, and obtaining a higher temperature of the exhaust gases, thereby to improving the recombustion efficiency of the combustible gases in the manifold reactor. However, the deep trailing recess possesses the problem that it deteriorates the output performance of the engine. By contrast therewith, it has also been proposed to provide a deep leading recess at the peripheral portion of the rotor, positioned close to the leading end thereof, as seen in the rotational direction of the rotor, for the purpose of improving the output performance of the engine. However, this deep leading recess adversely affects the aforementioned supression of the generation of harmful NO gas, the reducing of the emission of the combustible gases and the improving of the purifying performance of the manifold reactor.

SUMMARY OF THE INVENTION

Therefore, it is the object of the present invention to counteract the aforementioned problems of conventional rotary piston engine and to provide an improved rotary piston engine by preventing the overlapping of the intake and exhaust systems so as to restrict the internal exhaust gas recirculation or remaining ratio. According to the present invention, the intake efficiency is improved and the limit of the lean fuel air mixture combustion, moderating the maximum combustion pressure is broadened, thereby to suppressing the generation of harmful NO gas, extending the combustion time which reduces the emission of the combustible gases such as CO, HC, etc, and raising the exhaust gas temperature which to improves the purifying efficiency of the manifold reactor.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the abovementioned object is accomplished in the rotary piston engine of the aforementioned type, by providing leading and trailing recesses at the peripheral portion of the rotor extending between each of the adjacent apexes thereof, located in front of the rotor contact point at the opening phase of the exhaust port (mentioned below) and behind the rotor semi-contact point at the closing phase of the exhaust port (mentioned below), respectively, as seen in the rotational direction of the rotor.

When the aforementioned conditions regarding the leading and trailing recesses are satisfied, the leading and trailing recesses can be provided without causing the overlapping of the intake and exhaust systems and without substantially increasing the internal exhaust gas remaining space. Thus the improvement of the output performance of the engine is accomplished by the leading recess, while the trailing recess contributes to moderating the maximum combustion pressure thereby to suppressing the generation of harmful NO gas, extending the combustion time which reduces the emission of the combustible gases such as CO, HC, etc, and improving the purifying performance of the manifold reactor due to a rise in the exhaust gas temperature.

The respective volumetric ratio of the leading and trailing recesses should preferably be about 3:1. Also, the trailing recess is dimensioned so as to increase the engine operating chamber above 1.5 times. In this respect, it is desirable if the ratio of the circumferential length of the leading recess to that of the trailing recess is about 3:1 so that the leading and trailing recesses may be substantially of the same depth.

Furthermore, the trailing recess should preferably be dimensioned to increase the volume of a rear part of the operating space twice as much at the closing phase of the exhaust port (FIG. 8, mentioned below), the operating space being defined by the cooperation of the peripheral portion of the rotor extending between two adjacent apexes thereof and the inside surface of the center housing.

The leading recess should preferably be formed to have a circumferential sectional shape wherein its deepest portion is positioned in front of its circumferential center as seen in the rotational direction of the rotor. By contrast therewith, it is favourable that the deepest portion of the trailing recess is positioned behind its circumferential center as seen in the rotational direction of the rotor.

Furthermore, the leading recess should preferably be widened gradually toward the rotational direction of the rotor, while the width of the trailing recess may be substantially constant along the rotational direction of the rotor.

However, it should be understood that the aforementioned features regarding the shape of the leading and trailing recesses merely represent preferred embodiments and do not necessarily form the gist of the present invention and that the configuration of the recesses may be varied in various ways as long as the aforementioned conditions regarding the rotor contact point at the opening phase of the exhaust port and the rotor semi-contact point at the closing phase of the exhaust port are satisfied.

BRIEF DESCRIPTION OF THE DRAWING

The present invention will become more fully understood from the detailed description given hereinbelow and the accompanying drawings which are given by way of illustration only, and thus are not limitative of the present invention and wherein, In the accompanying drawing.

DESCRIPTION OF THE PREFERRED EMBODIMENT

The present invention will now be described in more detail with respect to a preferred embodiment and with particular reference to the accompanying drawings.

Figure 1:
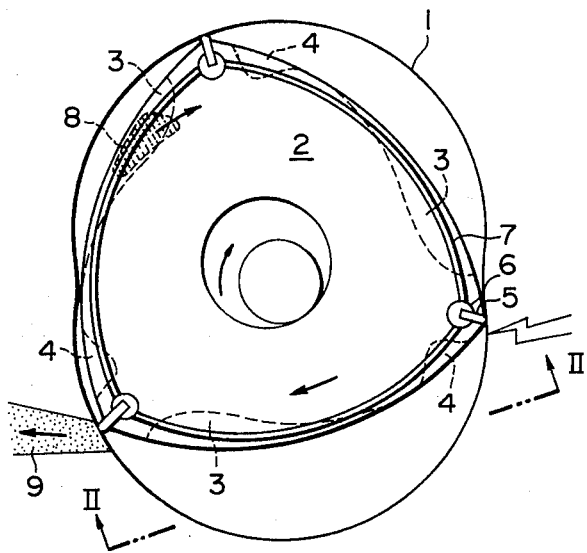
FIG. 1 is a side view of a rotor portion of a rotary engine including a rotor which incorporates the structure according to this invention.
Figure 2:
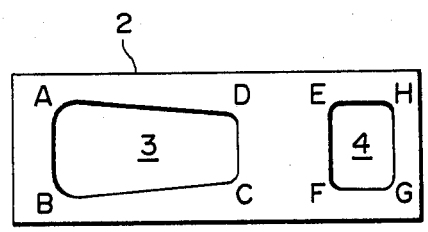
FIG. 2 is a plan view of the circumferential portion of the rotor shown in the direction of arrow II—II.

FIG. 1 is a side view of a rotor portion of a rotary piston engine including a rotor incorporating the structure according to the present invention. Reference numeral 1 designates a center housing having a trochoidal inside surface, and 2 is a polygonal rotor adapted to rotate eccentrically with its apexes contacting the trochoidal inside surface of the center housing. The rotor 2 is formed with leading recesses 3 and trailing recesses 4 at peripheral portions thereof and extending between each of the adjacent apexes thereof. According to one of the embodiments of the present invention, the leading and trailing recesses are formed in the shape as shown in FIG. 2 which is a plan view of the peripheral portion of the rotor. In FIG. 1, 5 is an apex seal provided at the apex portion of the rotor and adapted to slide over the inside surface of the center housing 1. Element 6 is a corner seal and 7 is a side seal which maintain oil and air tightness between the rotor and side housing. Element 8 is an intake port opening at the inside surface of the side housing and 9 is an exhaust port opening at the inside of the center housing.

The operation of the rotary piston engine incorporating a rotor equipped with the leading and trailing recesses according to this invention will now be described with reference to FIGS. 3–8.

Figure 3:
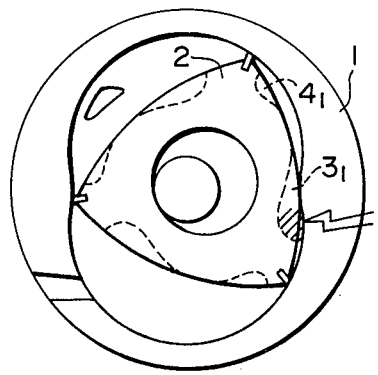
FIGS. 3–8 are views for explaining the operational manner of the rotary engine shown in FIG. 1 and, FIG. 9 is a graph exemplarly showing the distance between the center housing and the rotor flank at the opening and closing phase of the exhaust port with reference to the position along the rotor flank.
Figure 6:
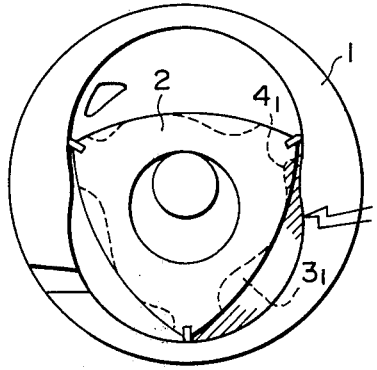
Figure 4:
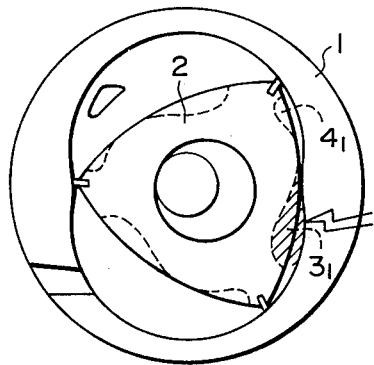
Figure 7:
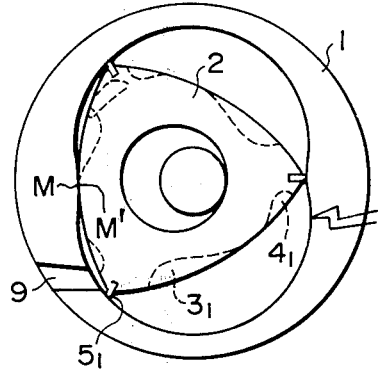
Figure 5:
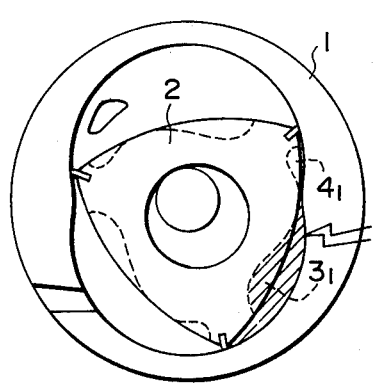

FIG. 3 shows a condition where the operating space including a leading recess $3_1$ and a trailing recess $4_1$ has just completed the compression stroke and the explosion or combustion stroke is initiated. When the fuel air mixture contained in this operating space is ignited, the combustion propagates rapidly in the rotational direction of the rotor but slowly in the opposite direction due to a relatively high flowing speed of the fuel air mixture, and thus a combusting condition as shown in FIG. 4 is brought about. During the period when the condition shown in FIG. 4 proceeds to that shown in FIG. 5 where the rotor has somewhat further rotated, the fuel contained in the trailing recess $4_1$ is kept almost uncombusted due to a quench effect achieved by the incorporation of a flank a (portion between DC-EF, as seen in FIG. 2) between the two recesses and the inner wall of the center housing, whereby a damping effect of the supressing the combustion pressure is obtained. As the rotor further rotates to attain the condition as shown in FIG. 6, the inside of the trailing recesses is opened to the leading side of the combustion chamber, whereby the combustable gases contained in the trailing recess $4_1$ is ejected into the high temperature combustion gases and thereby combusted. While the combustion is maintained, the cycle proceeds to the exhausting stroke.

When the apex seal $5_1$, forming the leading end of the operating space, including the leading recess $3_1$ and the trailing $4_1$, starts to traverse the exhaust port 9 (FIG. 7), since the exhaust gas pressure in this early period of the exhaust stroke is high, the exhaust gases will readily leak into the combustion chamber located beyond the cusp portion of the center housing in the conventional rotor and thus, internal exhaust gas recirculation is produced during the overlap period until the exhaust port is closed. Also, it frequently occurs that the exhaust gases enter into the intake port. By contrast with the conventional structure, in the structure according to the present invention, when the apex seal $5_1$ starts to traverse the exhaust port 9, this instant being herein called the opening phase of the exhaust port (the condition shown in FIG. 7), a substantial contact is attained between point M of the center housing 1 and point M' of the rotor 2 (these points being herein called the rotor contact point at the opening phase of the exhaust port). Thus the leading recess is disposed in a position in front of the aforementioned rotor contact point at the opening phase of the exhaust port as seen in the rotational direction of the rotor. Therefore, the structure of the rotor according to the present invention, the high pressure exhaust gases are prevented from leaking into the intake side beyond the rotor contact point at the opening phase of the exhaust port.

Figure 8:
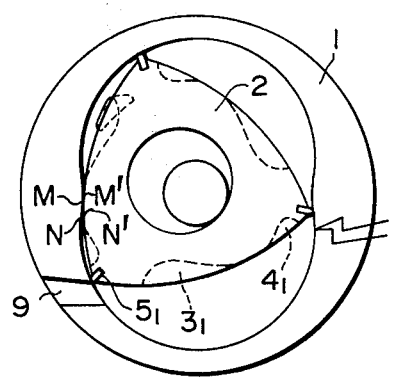

When the apex seal $5_1$ has come to the position where it completes the traverse of the exhaust port 9 by the further rotation of the rotor (this instant being herein called the closing phase of the exhaust port, as seen in FIG. 8), a semi-contacting condition is obtained between point N of the center housing and point N' of the rotor (this point being herein called the rotor semi-contact point at the closing phase of the exhaust port) and the trailing recess is disposed in a position behind the rotor semi-contact point at the closing phase of the exhaust port, as seen in the rotational direction of the rotor. When the trailing recess is positioned behind the rotor semi-contact point at the closing phase of the exhaust port as seen in the rotational direction of the rotor, a flank portion of a sufficient length exists between the rotor contact point M' at the opening phase of the exhaust port and the rotor semi-contact point N' at the closing phase of the exhaust port (portion between DC-EF as seen in FIG. 2), whereby the intake side is effectively isolated from the exhaust side. Furthermore, since the space left between the rotor semi-contact point N', at the closing phase of the exhaust port, and the apex seal $5_1$ is relatively small, the amount of the exhaust gases remaining therein is also small, whereby the internal exhaust gas recirculation or remaining ratio in the structure according to the present invention is supressed at a very low level when compared with the structure of conventional the rotors.

FIG. 9 shows the distance between the center housing and the rotor flank at the opening and closing phases of the exhaust port with reference to position along the rotor flank. From this figure, the existance of the rotor contact point at the opening phase of the exhaust port as well as the rotor semi-contact point at the closing phase of the exhaust port is confirmed.

The invention being thus described, it will be obvious that the same may be varied in many ways. Such variations are not to be regarded as a departure from the spirit and scope of the invention, and all such modifications are intended to be included within the scope of the following claims.

I claim:

1. A structure of a rotor of a rotary piston engine comprising at least two side housings and a center housing disposed therebetween, said housings defining a casing containing a polygonal rotor eccentrically, rotatably disposed therein, the apexes of said rotor contacting the inside surface of said center housing in a manner to perform suction, compression, combustion, expansion and exhaust strokes due to a change of the volume of chambers defined by said casing and said rotor, an exhaust port provided at the wall of said center housing, the opening of the exhaust port being controlled by the apexes of the rotor, traversing the opening wherein the peripheral portion of said rotor extending between each of the adjacent apexes thereof is provided with a leading recess and a trailing recess, said leading recess being positioned in front of a first point where the rotor contacts the center housing, at the opening phase of the exhaust port, as seen in the rotational direction of the rotor, and said trailing recess being positioned behind a second point where the rotor is in semi-contact with the center housing at the closing phase of the exhaust port, as seen in the rotational direction of the rotor, whereby said first and second points define a flank portion disposed between said leading and trailing recesses, said flank portion isolating the intake side of the rotor from the exhaust side so that the exhaust gas is inhibited from recirculating from a combustion chamber operating in an expansion stroke to another combustion chamber operating in an intake stroke by way of the exhaust port during the period when the apex of the rotor traverse the exhaust port.

2. A structure of a rotor of a rotary piston engine comprising at least two side housings and a center housing disposed therebetween, said housings defining a casing containing a polygonal rotor eccentrically, rotatably disposed therein the apexes of said rotor contacting the inside surface of said center housing in a manner to perform suction, compression, combustion, expansion and exhaust strokes due to a change of the volume of chambers defined by said casing and said rotor, an exhaust port provided at the wall of said center housing, the opening of the exhaust port being controlled by the apexes of the rotor, traversing the opening wherein the peripheral portion of said rotor extending between each of the adjacent apexes thereof is provided with a leading recess and a trailing recess, said leading recess being positioned in front of a first point where the rotor contacts the center housing, at the opening phase of the exhaust port, as seen in the rotational direction of the rotor, and said trailing recess being positioned behind a second point where the rotor is in semi-contact with the center housing at the closing phase of the exhaust port, as seen in the rotational direction of the rotor.

3. The rotor according to claim 2, wherein the volumetric ratio to the leading recess of the trailing recess is about 3:1.

4. The rotor according to claim 2, wherein the ratio of the peripheral length of the leading recess to that of the trailing recess is about 3:1.

5. The rotor according to claim 2, wherein the trailing recess is dimensioned so as to increase the engine operating chamber above 1.5 times.

6. The rotor according to claim 2, wherein the leading recess is adapted to have its deepest portion in front of its peripheral center as seen in the rotational direction of the rotor.

7. The rotor according to claim 2, wherein the trailing recess is adapted to have its deepest portion behind its peripheral center as seen in the rotational direction of the rotor.

8. The rotor according to claim 2, wherein the width of the leading recess is gradually increased toward the rotational direction of the rotor.

9. The rotor according to claim 2, wherein the width of the trailing recess is substantially constant along the rotational direction of the rotor.

* * * * *